Aug. 27, 1946.   R. J. KIEFFER   2,406,694
WELDING MACHINE
Filed Dec. 16, 1944   3 Sheets-Sheet 3
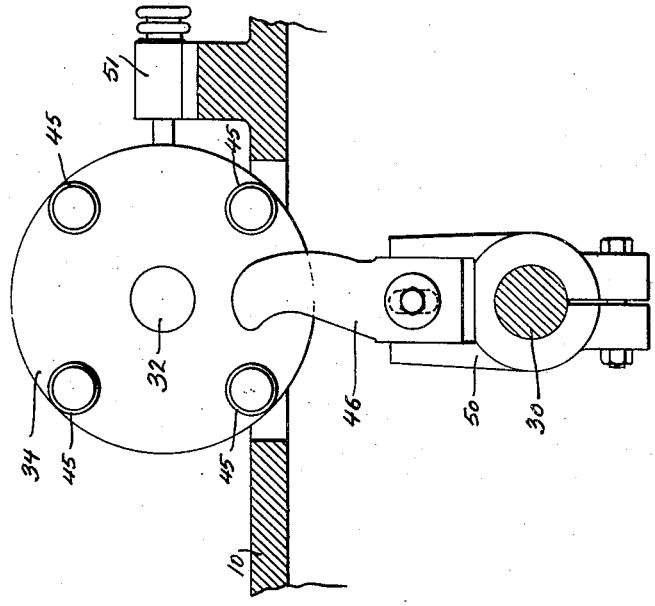
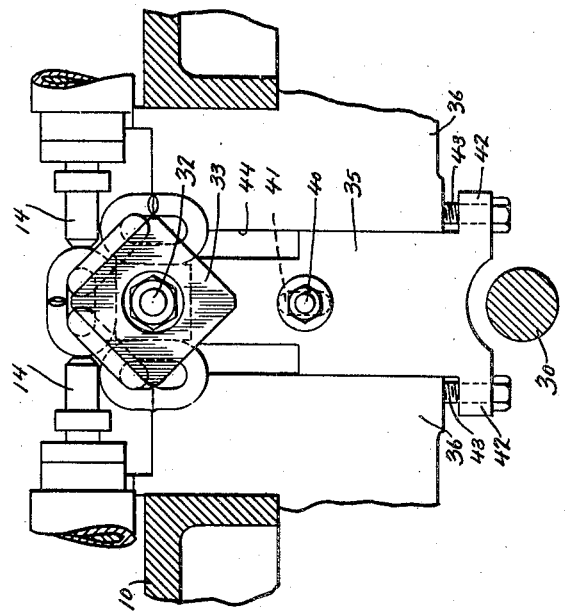
INVENTOR
*Raymond J. Kieffer*
BY
*Beau, Brooks, Buckley & Beau*
ATTORNEYS Patented Aug. 27, 1946

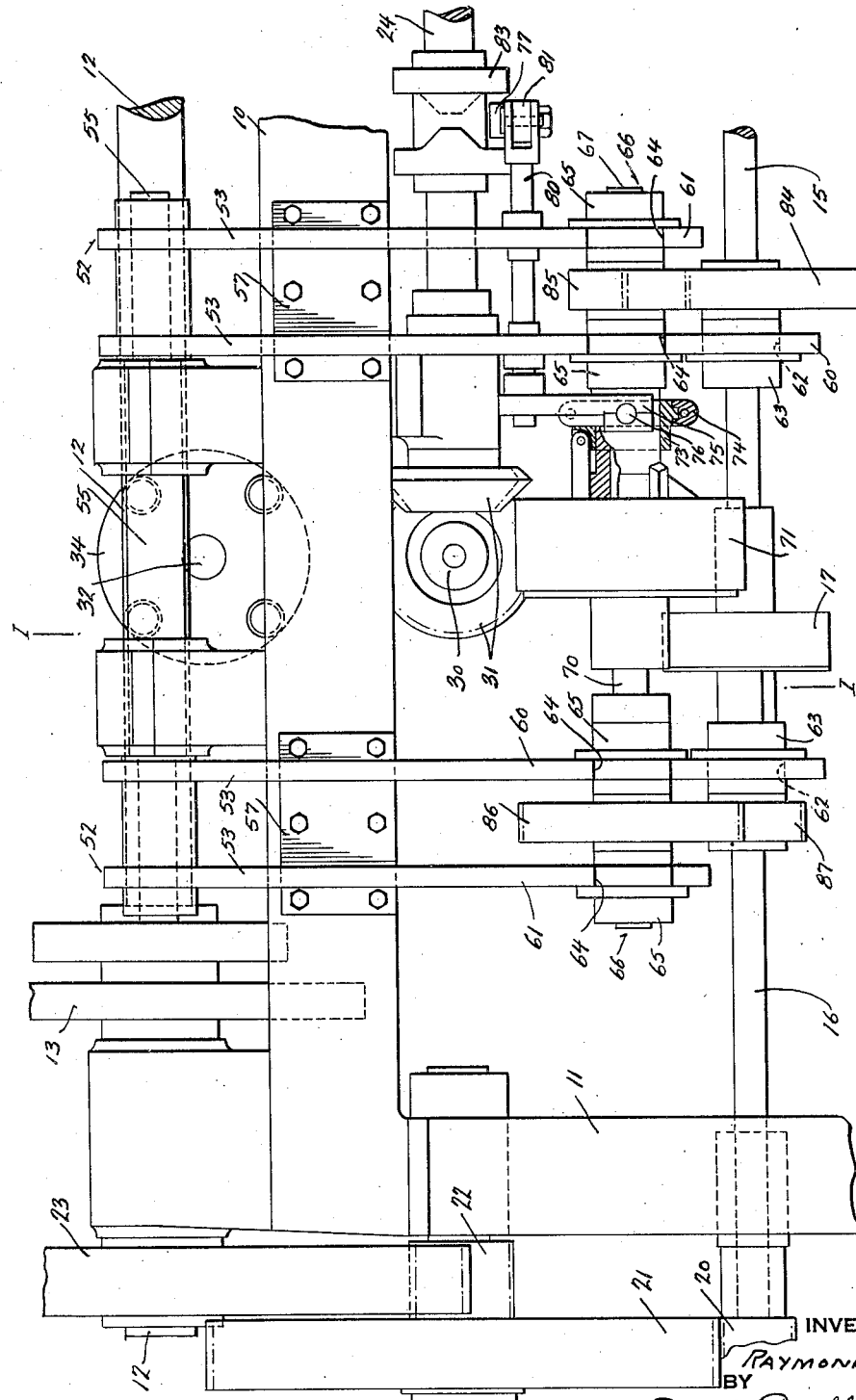

2,406,694

UNITED STATES PATENT OFFICE 2,406,694

WELDING MACHINE

Raymond J. Kieffer, Tonawanda, N. Y., assignor to Columbus McKinnon Chain Corporation, Tonawanda, N. Y., a corporation of New York Application December 16, 1944, Serial No. 568,545

5 Claims. (Cl. 59—32)

It is well known to those skilled in the art that in chain welding machines the speed of operation is, of necessity, very slow because of the time involved in the actual welding of the link joint. Since the chain feeding wheel is operated in synchronism with the welding mechanism, considerable time is lost each time a new link is fed to welding position.

The principal object of my invention has been to provide a chain welding machine having two independent speeds of operation, one for actuating the upset bars during welding and the other for actuating the chain feed wheel during the chain feeding operation.

Another object has been to provide means for alternately and automatically changing the speed to synchronize with the two periods of operation.

Another object has been to provide a device having an auxiliary drive shaft arranged coaxially with the main drive shaft with means connecting the two portions of the shaft whereby the auxiliary shaft may be driven alternately at slow and fast speed.

The above objects and advantages have been accomplished by the device shown in the accompanying drawings of which:

Fig. 2 is a rear elevation of the same;

Fig. 3 is an enlarged, fragmentary sectional elevation of the device showing the chain feeding wheel, and is taken on line III—III of Fig. 1; and Fig. 4 is an enlarged, fragmentary sectional view showing the feed quadrant, and is taken on line IV—IV of Fig. 1.

Figure 1:
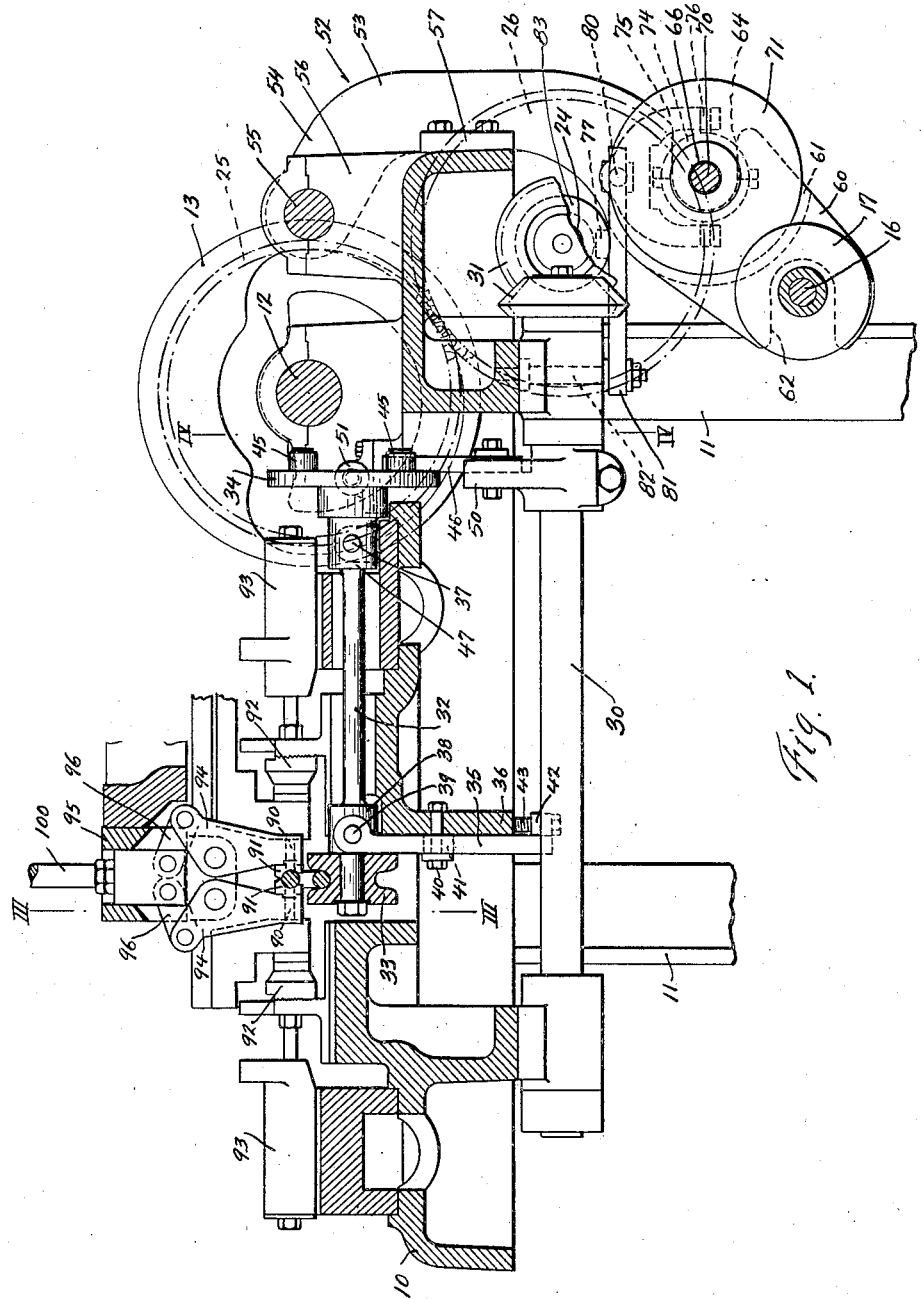
Fig. 1 is a side sectional elevation of a chain welding machine embodying my invention and is taken on line I—I of Fig. 2.

In the drawings, I have shown a chain welding machine having cam operated upset bars and hydraulically operated electrode holders and swaging dies. It is obvious, however, that my invention may be used upon machines having cam actuated electrodes and swaging dies.

The machine comprises a frame 10 suitably supported on standards 11. A main shaft 12 carrying the upset cams 13 is mounted on the frame in suitable bearings. These cams are suitably connected in well known manner to the upset bars 14 by means of toggle link connections. Since the specific means for operating the upset bars do not form part of my invention, they are, therefore, not shown in the drawings or further described. The speed of rotation of this shaft and cam is such as to properly squeeze the link ends together during the welding operation in a manner well known to those skilled in the art.

The drive shaft 15 of my device is constantly rotated at a speed which is suitable for the correct operation of the upset cams and bars during the welding process. Arranged preferably coaxially with the drive shaft 15 is an auxiliary drive shaft 16, and these two shafts are connected together by means of an overrunning clutch 17. This clutch may be any one of a number of designs well known to those skilled in the art, and the details are, therefore, not shown or described. This overrunning clutch is so arranged and connected that the auxiliary shaft 16 will be driven at the same speed as the drive shaft 15 during the period of welding operation, and will be permitted to rotate at a higher rate of speed during the period of chain feeding operation.

The auxiliary shaft 16 is connected to the main shaft 12 by a train of gears 20, 21, 22, and 23. A cam shaft 24 is suitably supported for rotation below the frame and this shaft is driven by and from the main shaft 12 through the medium of gears 25 and 26. A quadrant cam shaft 30 is arranged below the frame and preferably in the same plane as the cam shaft 24 but at right angles to said cam shaft. These two cam shafts are connected by means of a pair of bevel gears 31.

Arranged above the quadrant cam shaft 30 is the chain feed shaft 32, having a chain feed wheel 33 secured to one end and a feeding quadrant 34 to the other end. This shaft is arranged above the frame of the machine and is mounted in a suitable rear bearing 47 mounted on trunnions 37 suitably supported on the frame. A front shaft bearing 38 is provided which is mounted upon trunnions 39 supported in a bracket 25. This bracket is carried by the frame and is held in the adjusted position by means of a bolt 40, passing through the frame and a slot 41 formed in the bracket 35. The bracket is preferably provided with two ears 42 extending under the web 36, and with adjusting bolts 43 which extend through the ears and into the web, thereby providing means whereby the position of the bracket may be adjusted vertically. The bracket is preferably mounted in a groove 44 formed in the web, whereby it will be guided in its vertical adjustment.

The chain feed wheel, as shown in Fig. 3, is of the type in which each alternate link is supported in a vertical plane while being welded. The quadrant 34 is of the usual type having spaced rollers 45 which are engaged by a feed cam arm 46 for causing the periodic fractional rotation of the quadrant. The arm is adjustably carried by a feed cam 50 which is rigidly mounted upon the quadrant cam shaft 30. The customary quadrant brake 51 is provided which frictionally holds the quadrant in each of the positions to which it may be moved by the feed cam arm.

In order to facilitate assembling and disassembling of my invention, I provide two shaft brackets 52 arranged at the rear of the machine. Each of these brackets is formed with spaced flanges 53 having inwardly projecting arms 54 for support upon an aligning stud 55 which passes through suitable bearing standards 56 formed on the frame of the machine. The flanges of each bracket extend downwardly, having a pad 57 arranged between them, whereby the bracket may be secured to the frame of the machine. The flanges of each bracket terminate in downwardly and inwardly extending arms 60 and 61. Each arm 60 which is preferably longer than the adjacent arm 61 is preferably formed in its forwardly extending edge with a slot 62 in which is mounted a bearing 63 for supporting the drive shafts 15 and 16. Each of the arms 60 and 61 is also formed in its rearwardly extending edge with a slot 64 in each of which is mounted a bearing 65. These bearings 65 provide rotatable support for a two-part jack shaft 66. This jack shaft comprises a driving part 67 and a driven part 70. The two parts of the jack shaft are connected together by means of a friction clutch 71 which is a standard article of manufacture, and, therefore, is not shown or described in detail.

The friction clutch 71 is provided with a rotatable shifter collar 73 upon which is mounted a shifter strap 74. This strap is operated by means of a yoke 75 which is connected to the strap by means of trunnion bearings 76. The yoke 75 is carried by a shifter rod 80 which is slidably mounted in the flanges 53 of one of the brackets 52. The shifter rod is pivotally attached to a shifter arm 81 which at its opposite end is pivotally supported by means of a shifter arm stud 82 secured to the frame of the machine. The shifter arm extends across beneath the cam shaft 24 and it is provided with a shifter roller 77 which engages the working faces of a shifter cam 83 carried by the cam shaft 24 thereby causing the periodic operation of the clutch.

In order to provide means for periodically changing the speed of operation of the welding machine during the chain feeding period, I connect the jack shaft with the drive and auxiliary shafts by means of suitable gearing. The drive shaft 15 carries a gear 84 which meshes with a pinion 85 carried by the part 67 of the jack shaft, and the auxiliary shaft 16 carries a pinion 87 which meshes with a gear 86 carried by the part 70 of the jack shaft.

By this arrangement, the auxiliary shaft 16 will be rotated by and at the same speed as the drive shaft through the overrunning clutch 17 during the period of welding operation. When, however, the friction clutch 71 is actuated during the chain feeding period, the parts of the jack shaft will thereby be connected and the speed of rotation of the auxiliary shaft will be increased by said gears. During this period of increased speed of operation, the overrunning clutch will permit the auxiliary shaft to be rotated independently of the drive shaft.

My welding machine is provided with welding electrodes 90 and swaging dies 91. The electrodes are carried by electrode holders 92 and are actuated through the medium of hydraulic cylinders 93. The swaging dies are carried by suitable arms 94 which are actuated by means of a block 95 through the medium of toggle links 96. The block 95 is actuated by a rod 100 which is reciprocated in well known manner by means of a hydraulic cylinder (not shown). Since the electrodes and swaging dies do not form a part of my invention, they will not be further shown or described. When, however, my invention is used upon a welding machine having cam actuated electrodes and swaging dies, these parts may be actuated at a speed which synchronizes with the speed of operation of the chain feeding wheel.

While I have described the increased speed of rotation of the auxiliary shaft 16 during the chain feeding period, the cam 83 is preferably so designed as to extend this period to include movement of the bars up to their welding positions and movement thereof on the return stroke.

What is claimed is:

1. A welding machine, comprising a chain feeding wheel, a drive shaft, means for rotating said drive shaft at constant normal speed, means actuated by said drive shaft for intermittently rotating said wheel, an auxiliary drive shaft, and means connecting said drive shaft with said auxiliary shaft for increasing the speed of rotation of said auxiliary shaft above normal during the intermittent actuation of said wheel, including a two-part jack shaft in spaced relation with said drive shaft and said auxiliary shaft, gear means connecting said drive shaft with one part of said jack shaft, separate gear means connecting said auxiliary shaft with the other part of said jack shaft, clutch means for connecting the parts of said jack shaft and for connecting said drive shaft with said auxiliary shaft, and means for operating said clutch means, whereby the auxiliary shaft may be rotated alternately at normal speed and at increased speed.

2. A welding machine, comprising a chain feeding wheel, a drive shaft, means for rotating said drive shaft at constant normal speed, means actuated by said drive shaft for intermittently rotating said wheel, an auxiliary drive shaft, and means connecting said drive shaft with said auxiliary shaft for increasing the speed of rotation of said wheel during the intermittent actuation thereof, including a two-part jack shaft in spaced relation with said drive shaft and said auxiliary shaft, gear means connecting said drive shaft with one part of said jack shaft, separate gear means connecting said auxiliary shaft with the other part of said jack shaft, friction clutch means for connecting the parts of said jack shaft, separate clutch means for connecting said drive shaft with said auxiliary shaft for permitting said auxiliary shaft to be operated alternately at normal speed and at increased speed, and means for operating said friction clutch means, whereby the parts of said jack shaft may be periodically connected and disconnected.

3. The combination with a chain welding machine having upset bars, a drive shaft, means connecting said shaft to said bars for actuating the latter, and means for rotating said shaft at a constant speed suitable for bar actuation during welding, of a chain feeding wheel, means actuated by said drive shaft for intermittently rotating said wheel, and means for increasing the speed of rotation of said wheel above the speed of rotation of said drive shaft during the intermittent actuation of said wheel, comprising an auxiliary drive shaft, clutch means for connecting said drive shaft with said auxiliary shaft, said clutch means being capable of operating said auxiliary shaft by, and at the same speed as, said drive shaft and of permitting the auxiliary shaft to be rotated at a higher rate of speed than the drive shaft, a two-part jack shaft in spaced relation with said drive shaft and said auxiliary shaft, gear means for connecting said drive shaft with one part of said jack shaft, gear means for connecting said auxiliary shaft with the other part of said jack shaft, friction clutch means for connecting the two parts of the jack shaft, and means for operating said friction clutch during the intermittent rotation of said chain feeding wheel.

4. A welding machine having a frame, spaced bearing brackets carried by the frame, a drive shaft rotatably supported by one of said brackets, an auxiliary drive shaft supported by the other of said brackets in coaxial relation with said drive shaft, a chain feeding wheel, means connecting said drive shaft with said wheel to cause said wheel to be intermittently rotated, an overrunning clutch for connecting said drive and auxiliary shafts, a two-part jack shaft supported by said brackets, a friction clutch connecting the parts of said jack shaft, gear means connecting said jack shaft with said drive and auxiliary shafts, and means for periodically actuating said friction clutch, whereby said auxiliary shaft may be periodically rotated at a speed above that of said drive shaft.

5. A welding machine having a frame, spaced bearing brackets carried by the frame, each having spaced flanges, a drive shaft rotatably supported by one of said brackets, an auxiliary drive shaft supported by the other of said brackets in coaxial relation with said drive shaft, a chain feeding wheel, means connecting said drive shaft with said wheel to cause said wheel to be intermittently rotated, an overrunning clutch for connecting said drive and auxiliary shafts, a two-part jack shaft, one of said flanges of each bracket being shorter than the other flange and providing bearing support for said jack shaft only, a friction clutch connecting the parts of said jack shaft, gear means connecting said jack shaft with said drive and auxiliary shafts, and means for periodically actuating said friction clutch, whereby said auxiliary shaft may be periodically rotated at a speed above that of said drive shaft.

RAYMOND J. KIEFFER.